United States Patent [19]

Smither

[11] Patent Number: 4,527,261
[45] Date of Patent: Jul. 2, 1985

[54] HILINE INTERFERENCE ELIMINATOR

[75] Inventor: Miles A. Smither, Houston, Tex.

[73] Assignee: AMF Incorporated, White Plains, N.Y.

[21] Appl. No.: 309,365

[22] Filed: Oct. 7, 1981

[51] Int. Cl.³ ............................................. G01V 1/36
[52] U.S. Cl. ...................................... 367/76; 367/43; 333/12
[58] Field of Search ........................ 367/76, 40, 38, 39, 367/43; 364/421; 324/83 R; 375/99, 102; 455/305, 312; 328/165; 307/520; 381/94; 333/12

[56] References Cited

U.S. PATENT DOCUMENTS

| | | | |
|---|---|---|---|
| 2,164,196 | 6/1939 | Woodyard et al. | 367/76 |
| 2,733,412 | 1/1956 | Alexander et al. | 367/76 |
| 3,163,750 | 12/1964 | Lindsey et al. | 364/421 |
| 4,105,942 | 8/1978 | Henry | 330/258 |
| 4,210,825 | 7/1980 | Crochiere et al. | 377/61 |
| 4,232,379 | 11/1980 | Ensing | 367/43 |

Primary Examiner—Nelson Moskowitz
Assistant Examiner—Ian J. Lobo
Attorney, Agent, or Firm—David E. Dougherty; John H. Gallagher

[57] ABSTRACT

The invention is a method and apparatus for substantially eliminating from a seismic signal channel an interfering hiline signal in a differential mode. Differential mode and common mode components of the interfering signal are coupled from the seismic signal channel, and are correlated with each other to obtain a correlation signal. The correlation signal and the common mode signal are multiplied to obtain a correction signal that is applied to the seismic signal channel to substantially eliminate the differential mode component of the hiline interference signal. The correlation between the differential mode and common mode signals is accomplished with both in-phase and quadrature phase components of one of them so that two correlation signals actually are produced.

17 Claims, 6 Drawing Figures

HILINE INTERFERENCE ELIMINATOR

BACKGROUND OF THE INVENTION

This invention relates to electronic circuitry means for eliminating from a seismic signal channel interfering signals of the type that have come to be known as hiline signals. As is well understood in the art of prospecting for underground oil deposits, a number of geophones, or similar devices, are distributed about an area in an array to detect seismic impulses. Long, two-wire electrical cables connect the respective geophones to signal processing equipment at a central location such as a truck or van. Desired seismic signals propagate on a two wire cable in what commonly is called a differential mode. That is, the signal represents a potential on one conductor relative to the potential on the second conductor.

The seismic equipment frequently is in the vicinity of electrical equipment and electrical transmission lines that carry current which is at a frequency of 60 Hertz in the U.S., and other frequencies in some other countries. Ideally, if the electrical cables that carry the seismic signals are electrically balanced with respect to each other and to their surroundings, the 60 Hertz stray currents and fields associated with the power lines and equipment will produce equal voltages in the two conductors of the cable. Signals of this type on the cable are called common mode signals.

High gain input amplifiers couple the seismic signals from the cables to signal processing equipment. These amplifiers are designed and constructed to amplify input signals in the differential mode, but provide up to 100 db, for example, rejection to common mode signals. If ideal conditions existed, the high gain input amplifiers could provide adequate isolation so that the undesired hiline common mode signals would not be present to any troublesome extent at the output terminals of the high gain amplifiers. However, because ideal conditions do not always exist in actual practice, the 60 Hertz currents and fields do not produce equal voltages on the two conductors of a cable. Consequently, an undesired 60 Hertz hiline signal is present on the cable in the differential mode. Because the high gain input amplifier is responsive to signals in the differential mode, the undesired 60 Hertz hiline signal in that mode will be present in the seismic signal that is coupled from the high gain amplifier to the signal processing apparatus.

Various means have been employed in attempts to eliminate the undesired differential mode signals from seismic signal channels. Notch filters have been employed, but they can be difficult and expensive to design and build. Additionally, their characteristics may vary in time. Furthermore, they may introduce phase shifts or other adverse effects into the seismic signals channels.

Other techniques are known for generating a signal that is substantially equal in amplitude and opposite in phase to the interfering signal. This generated signal is combined with the interfering signal to buck it out, or null it.

There are other approaches which attempt to precisely electrically balance the two lines of the cable so that the interfering 60 Hertz signal will appear on the cable only in the common mode. This signal then will be substantially eliminated by the high gain input amplifier that has very high common mode rejection characteristics. The present invention is of the latter type.

SUMMARY OF THE INVENTION

The present invention provides means and apparatus for obtaining from a two wire seismic channel a common mode signal component and a differential mode signal component of the undesired hiline signal. These signal components are correlated with each other to produce a correlating signal. Control and multiplying circuit means responsive to the correlating signal and to the common mode signal component as a reference signal produces a correcting signal which when coupled to the hi conductor of the seismic channel causes the line to appear balanced to the hiline signal, thereby substantially eliminating the differential mode component of the hiline signal from the input to the recorder input amplifier. The amplifier has high rejection characteristics for the remaining common mode component of the hiline signal so that this component is substantially eliminated by the input amplifier. In practice, in-phase and quadrature phase correlating and correcting signals components are produced to eliminate the corresponding in-phase and quadrature phase components of the differential mode hiline signal.

DESCRIPTION OF PREFERRED EMBODIMENT

In describing the invention, a typical seismic prospecting situation is assumed. That is, a plurality (1, 2, 3 ... n) of geophones or other devices for detecting seismic events are distributed in a given array, and each is connected by a respective two-wire line of a cable to a high gain input amplifier. Each amplifier couples seismic signals to signal processing apparatus. The signal processing apparatus may be of any type known in the art and will not be described since it forms no part of the present invention. The hiline interference eliminator apparatus of this invention is coupled to the cable at the input side of the high gain input amplifier.

In the presently preferred embodiment of the invention each seismic signal line or channel, has the complete hiline interference eliminating circuitry of this invention coupled to the channel at the input to the instrumentation amplifier of the signal processing equipment, or recorder, for example. Alternatively, multiplexing of some of the required circuitry could be practiced so that all the channels time share at least some common circuitry. Because the interference eliminating circuitry of each of the n channels is identical, only one will be described below.

Figure 1:
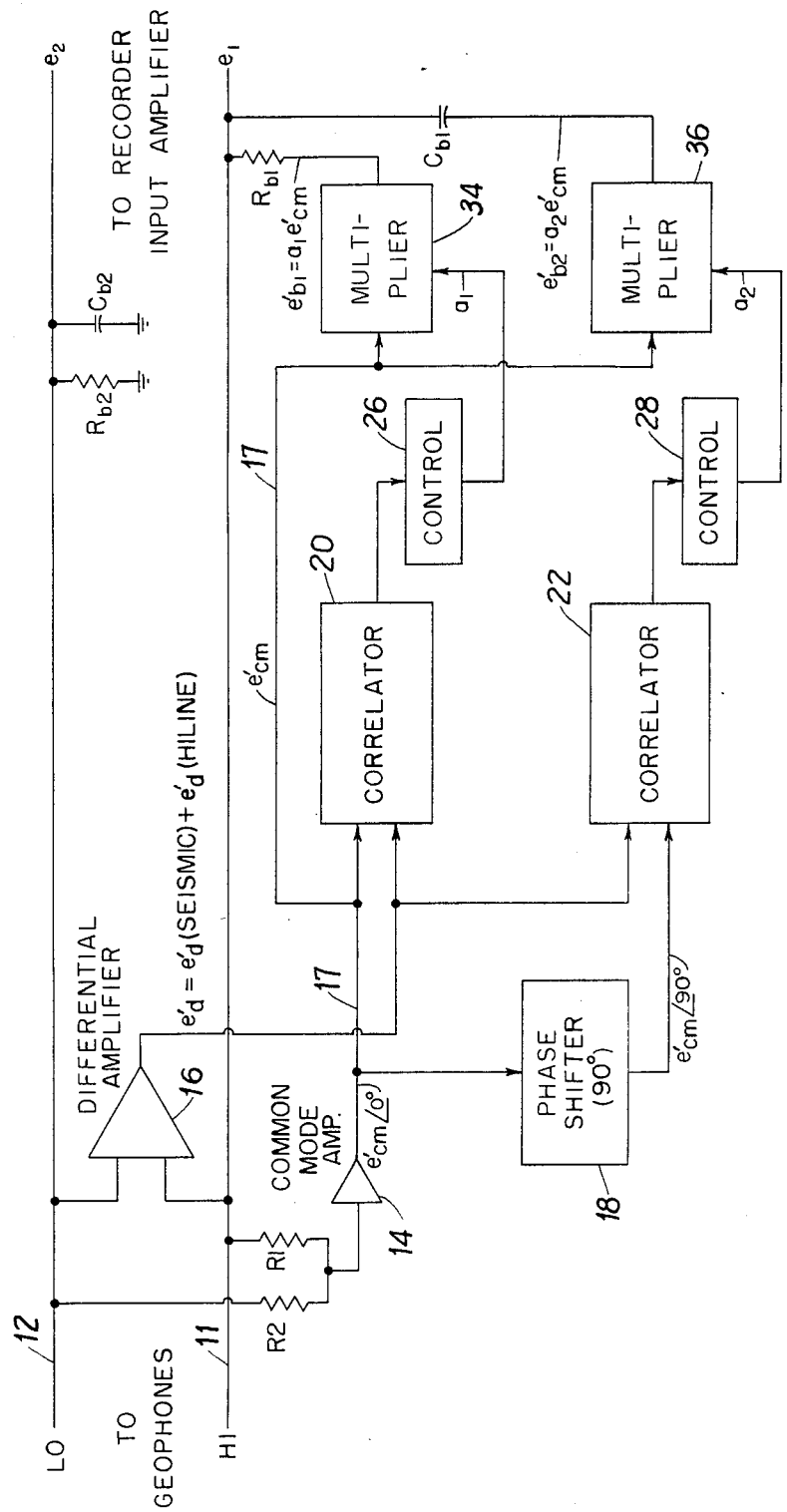
FIG. 1 is a simplified diagram, mostly in block form, illustrating the hiline interference eliminator circuitry of this invention.

A simplified block diagram of the present invention is shown in FIG. 1. The pair of conductors 11 and 12 are, respectively, the "hi" and "lo" conductors of a seismic channel. The left end of the conductors would be coupled to geophones and the right end would be coupled to the input of a conventional input amplifier of data processing and/or recording equipment. The input amplifier is characterized by a high common mode signal rejection ratio, as is common in the art. Resistors R1 and R2 are connected at one of their ends to the respecive lines 11 and 12 and are connected at their other ends to the input of common mode amplifier 14. The output signal e'cm of amplifier 14 is the common mode hiline interference signal that is on conductors 11 and 12. There is substantially no differential mode component in the output signal of amplifier 14.

Differential amplifier 16 has its two input terminals directly connected to conductors 11 and 12. Its output signal e'd is comprised of two components, one being the differential mode seismic signal e'd (seismic), and the other is the differential mode component of the hiline interference signal e'd (hiline). The common mode and differential mode components of the hiline interference will be at the same 60 Hz frequency while the seismic differential mode component e'd (seismic) will have the multifrequency content of the seismic signal.

In this invention, it is necessary to separate the hiline interference components of the differential mode signal e'd from the seismic signal component. As will be explained below, this is done by correlating the differential mode signal e'd with in-phase and quadrature phase components of the common mode signal e'cm in such a manner as to eliminate any effect of the differential mode seismic signal on the operation of the circuit of this invention.

The common mode signal e'cm at the output of amplifier 14 is coupled on lead 17 to one input terminal of signal correlator 20 and is coupled through a 90° phase shifter 18 to one input terminal of an identical signal correlator 22. The second input to the two correlators 20 and 22 is the differential signal e'd from amplifier 16 that is comprised of the seismic and hiline interference components. The respective output signals of correlators 20 and 22 are d.c. signals whose signs and magnitudes are indicative of the degree of correlation between the common mode signal component e'cm and differential mode signal components e'd of the hiline interference signal. That is, if there is no differential mode component of the hiline interference signal on conductors 11 and 12 the outputs of correlators 20 and 22 are zero. If there is a differential mode component of the hiline interference signal present on conductors 11 and 12, the correlators will produce output signals whose magnitudes represent, respectively, the magnitude of the in-phase and quadrature phase components of the signals e'cm and e'd (hiline) and whose signs represent the phase of e'd (hiline) relative to e'cm.

In briefly describing the functioning of correlators 20 and 22 it should be kept in mind that the initial balancing of the lines actually will take place prior to the time that actual seismic exploration is in progress. Accordingly, only the hiline interference signal e'd (hiline) will be present at that time. Each correlator circuit includes a multiplier circuit that functions in response to the 60 Hz common mode and differential mode hiline interference signal inputs to produce a corresponding output signal which is a sine$^2$ function of the two input signals. This sine$^2$ function signal is averaged in a low pass filter which produces a d.c. signal when the differential mode input thereto is other than zero. The sign of the output signal depends on the phase of the differential component signal input.

A differential mode seismic signal on the e'd input to the correlators will produce substantially no corresponding output signal because its multifrequency signal content will not significantly correlate with the 60 Hz common mode signal e'cm that is the other input to the correlators. Any such correlation thereby is a sine-cosine function that averages out to zero in the low pass filter that follows the multiplier circuit in each correlator.

The correlation output signals of in-phase and quadrature phase correlators 20 and 22 are coupled to respective control circuits 26 and 28 which produce control signals $a_1$ and $a_2$ that comprise control signal inputs to respective four-quadrant multipliers 34 and 36. The second signal input to each of the multipliers 34, 36 is the common mode signal e'cm that is coupled from amplifier 14 on conductor 17.

The operation of identical control circuits 26 and 28 is described below, but briefly, they provide $a_1$ and $a_2$ control signals which when multiplied with the finite common mode signal e'cm will produce respective balancing signals which when coupled to resistor Rb and capacitor Cb will establish a balance of the induced hi-line interference signal on lines 11 and 12. That is, the hiline differential mode signal component e'd is substantially eliminated from the input terminals of the recorder input amplifier. That leaves only the common mode hiline interference signal e'cm on lines 11 and 12. As previously stated, the recorder input amplifier has high common mode rejection capabilities and will satisfactorily attenuate this component.

Figure 2:
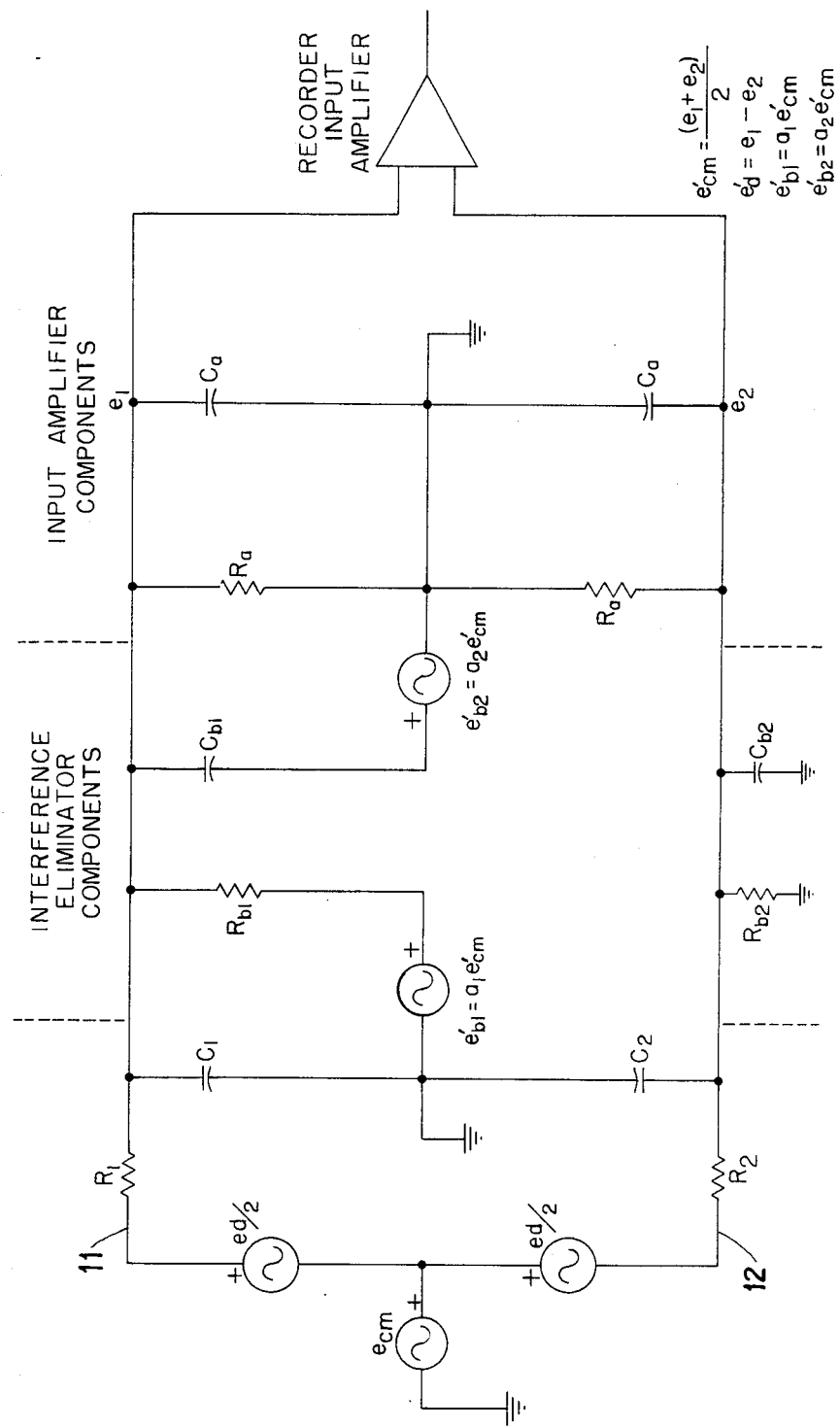
FIG. 2 is a simplified equivalent circuit diagram used in explaining the principles of operation of this invention.

A more conceptual explanation of this invention is here given in connection with FIG. 2. The two conductors of the geophone line or channel are illustrated at 11 and 12. The voltage $e_{cm}$ represents the hiline interference common mode signal source and the voltage $e_d$ represents the hiline interference differential mode signal source. R1, C1 and R2, C2 represent the resistance and capacitance of the respective conductors 11 and 12. Ra, Ca represent the resistance and capacitance associated with the input circuit of the recorder input amplifier which has the high common mode rejection characteristic. The resistors Rb1, Rb2 and capacitor Cb1, Cb2 are associated with the circuitry of this invention. The voltage sources eb1 and eb2 correspond to the output voltage of multipliers 34 and 36 of FIG. 1 and are the generated signals that cause the line to appear to be balanced for the in-phase and quadrature phase components of the hiline interference.

In considering the theoretical circuitry of FIG. 2, it may be seen that if the control signal $a_1$ is zero, the balancing voltage signal eb1 also will be zero and resistor Rb1 will be connected directly to ground potential. This then will match the condition associated with resistor Rb2 connected between line 12 and ground and no balancing or compensation is added to the line. Control signal $a_1$ can be zero only when the lines 11 and 12 are inherently balanced and there is no differential mode interference signal e'd (hiline), as will be explained in more detail below.

If control signal $a_1$ has a value equal to one, its maximum positive value, the balancing voltage eb1 is equal to e'cm. This is substantially the same value as e'cm on the top side of resistor Rb1 and the effect is the same as if resistor Rb1 were completely removed from the circuit. Correcting signal $a_1$ has its maximum positive value only in response to an unbalance of the line that exceeds a given limit in one direction.

If the control signal $a_1$ has a value minus one, its maximum negative value, the polarity of e'b1 will, in effect, reverse and twice the current will flow through Rb1. This has the effect of making Rb1=½Rb2. Control signal $a_1$ will have its maximum negative value only when the unbalance on the line is beyond a given limit in the direction opposite to that when $a_1$ was positive.

Figure 3:
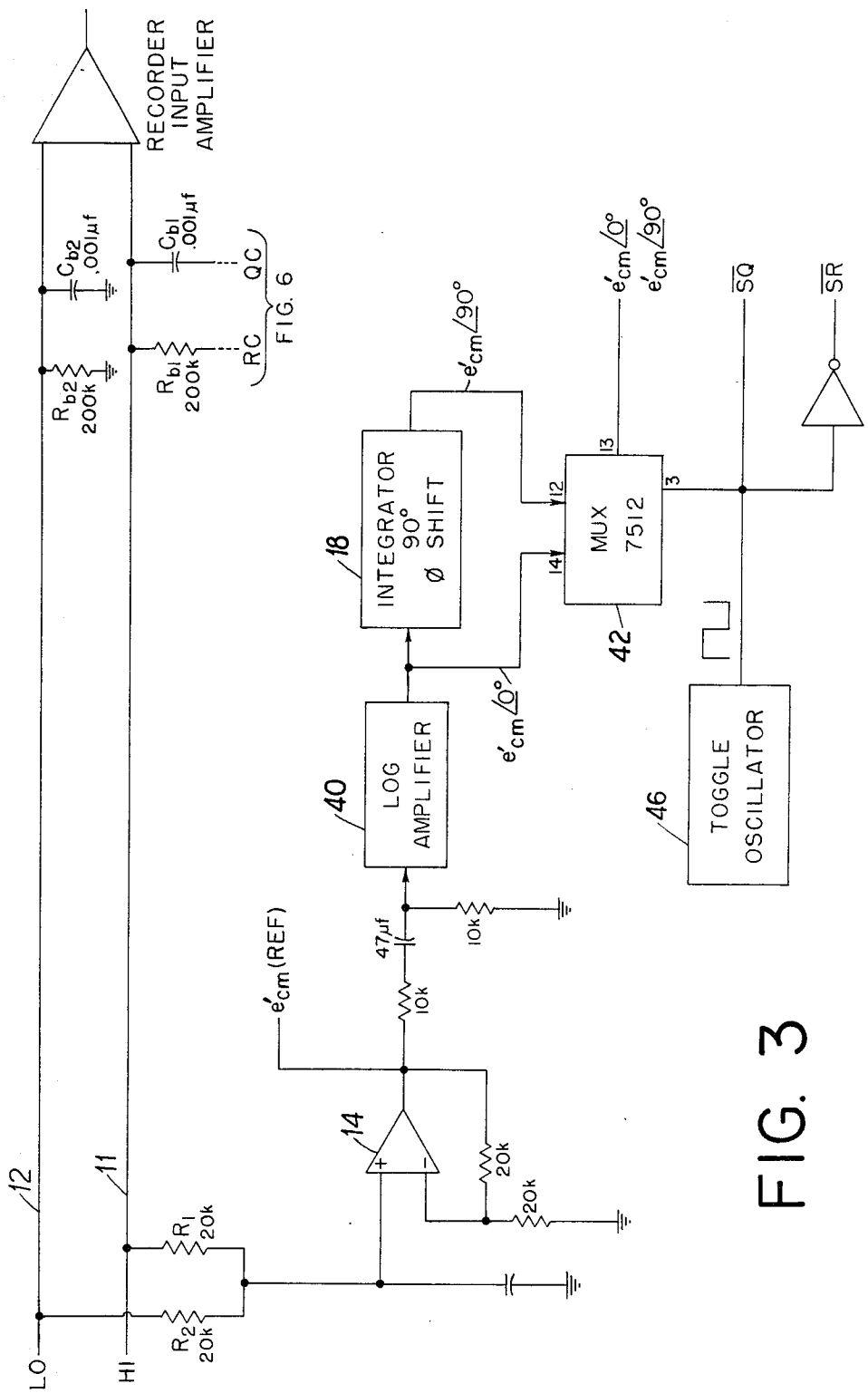
FIGS. 3-6 are circuit diagrams showing the details of the circuitry that is illustrated in more general terms in FIG. 1.

The details of the construction and operation of the circuitry of this invention will be explained in connection with FIGS. 3-6. Referring first to FIG. 3, the high and low conductors 11 and 12 of a seismic channel are coupled by parallel resistors R1 and R2 to the plus input of the common mode amplifier 14 which is an operational amplifier. The output signal of amplifier 14 is the common mode signal e'cm. This signal later will be used as a reference signal e'cm (ref) in another part of the circuit. The signal also is a.c. coupled to a conventional logarithmic amplifier 40. The output of log amplifier 40 is connected to input pin 14 of an analog multiplexing circuit 42, and is coupled to the input of an integrating operational amplifier 18 that introduces a 90° phase shift to the signal, thereby producing the quadrature phase component of the common mode signal.

The switching or toggling input signal at pin 3 of multiplexing circuit 42 is obtained from toggle oscillator circuit 46, a bi-stable circuit that produces the illustrated square waveform that has 50 percent duty cycle. This switching waveform causes multiplexing circuit 42 to couple the input signal e'cm ∠0° to output pin 13 when the switching waveform is high and to couple input signal e'cm ∠90° to output pin 13 when the switching waveform is low. The toggle or switching waveform from toggle oscillator 46 also is available at a terminal designated $\overline{SQ}$, and an inverse toggle waveform is available at a terminal designated $\overline{SR}$. Multiplexer circuit 42 may be the Protected Analog Switches AD 7512 type, described on pages 14–13 through 14–20 of the specification sheets by Analog Devices Incorporated.

Resistor $R_{b1}$ and capacitor $C_{b1}$ each have one of their ends connected to hi conductor 11 adjacent the input terminal of the recorder input amplifier. The other ends of resistor $R_{b1}$ and capacitor $C_{b1}$ are coupled to the multipliers 34 and 36 and receive the respective correcting signals RC and QC which are produced in the circuitry of FIG. 6. Resistor $R_{b2}$ and capacitor $C_{b2}$ each have one end connected to "lo" conductor 12 at a location adjacent the recorder input amplifier. The other end of each is grounded.

Figure 4:
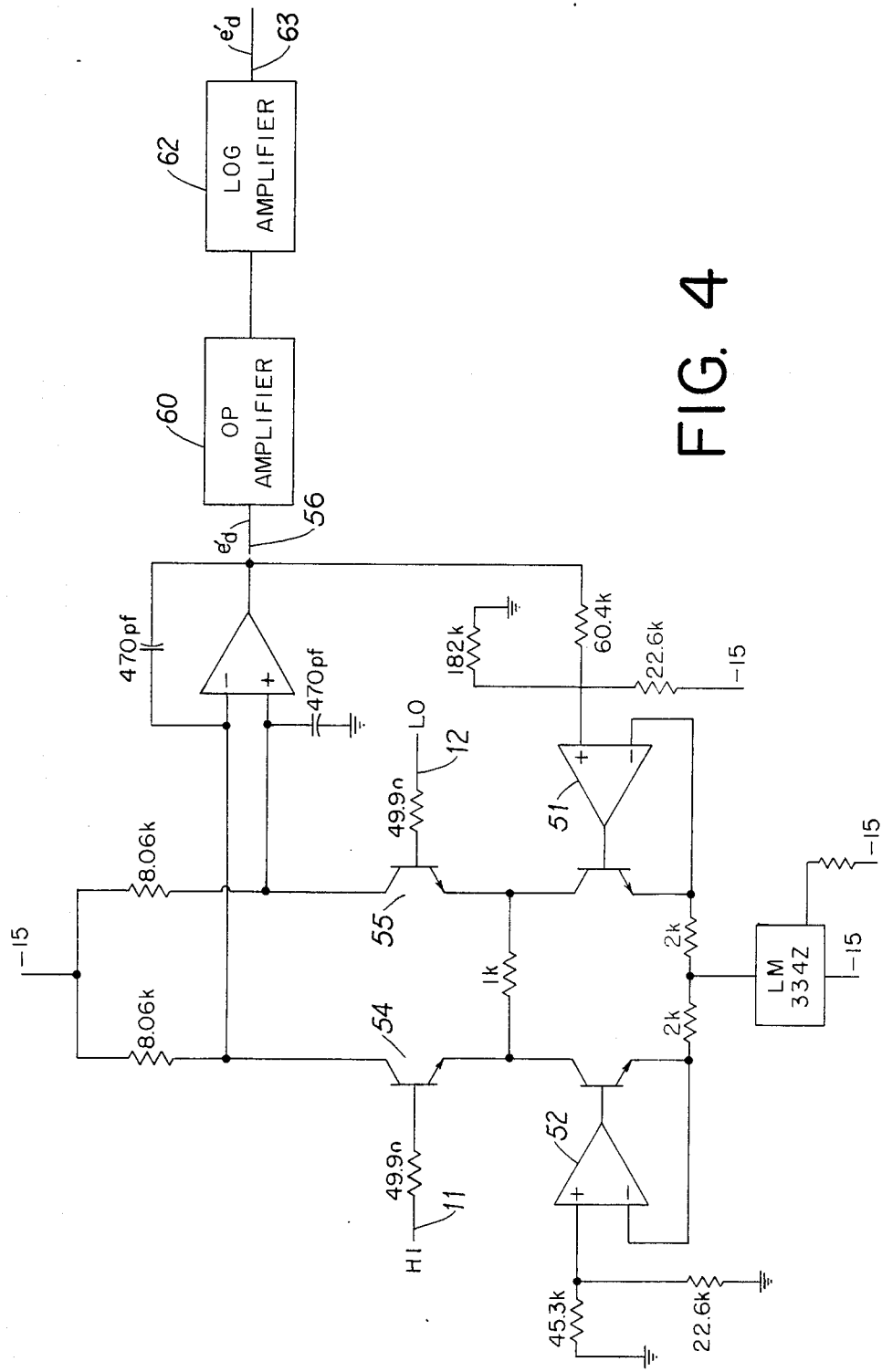

The differential mode amplifier 16 is illustrated in FIG. 4. This amplifier is a modification of the known differential amplifier disclosed in the manufacturer's specification sheets on the LM 363 Precision Instrumentation Amplifier, dated February 1981, by National Semiconductor Corporation. The modification is comprised of the addition of the operational amplifiers 51 and 52 to make the response characteristic of the differential amplifier more linear. As seen in FIG. 4, the hi conductor 11 of the seismic line or channel is connected to the base electrode of transistor 54 and the lo conductor 12 is coupled to the base electrode of transistor 55. For further details of the differential amplifier 16, reference is made to the above-mentioned specification sheet. Suffice it to say here that the output signal on output terminal 56 is substantially only the differential mode signal e'd on lines 11 and 12. As mentioned previously, this signal may have a component e'd (seismic) which is the desired seismic signal in the differential mode, and a component e'd (hiline) which is the undesired hiline interference signal component in the differential mode.

The differential mode signal e'd from output terminal 56 of differential amplifier 16 is coupled through high gain operational amplifier 60 and then through a high gain logarithmic amplifier 62, both of conventional design. The amplified differential mode signal e'd appears at output terminal 63 of log amplifier 62.

Figure 5:
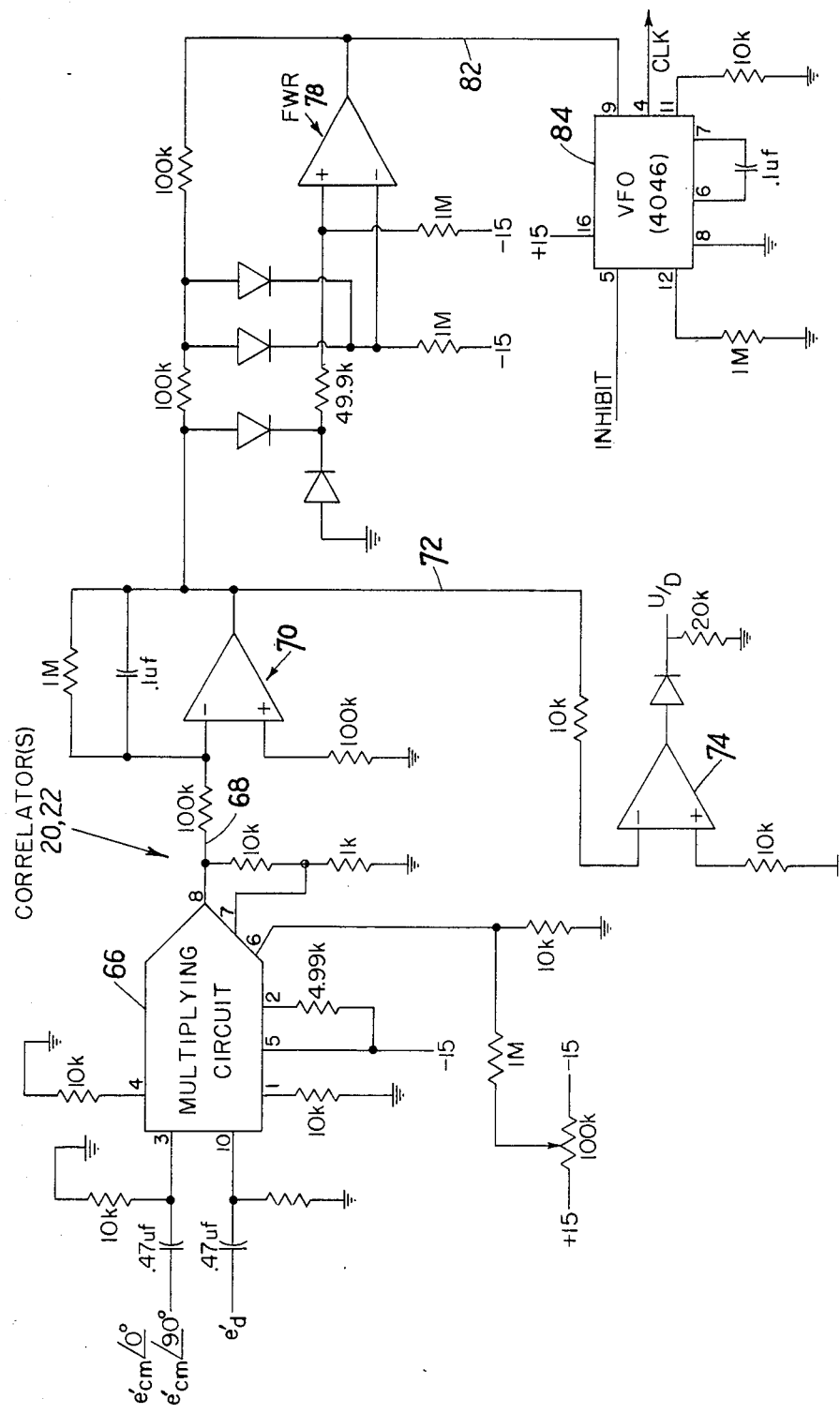

Reference now will be made to FIG. 5 where the multiplexed in-phase and quadrature phase common mode signals e'cm ∠0° and e'cm ∠90° from output pin 13 of multiplexing circuit 42, FIG. 3, are alternately correlated with the differential mode signal e'd from output terminal 63 of FIG. 4. As illustrated in FIG. 5, the input signals are a.c. coupled to input pins 3 and 10 of analog multiplying circuit 66, a known circuit described in the manufacturer's specification sheets on the four-quadrant Precision IC Multiplier AD 534, pages 4–17 through 4–24, by Analog Devices Incorporated. The alternately occurring in-phase and quadrature phase common mode signals are multiplied with the continuously occurring differential mode signal e'd, and the alternately occuring product signals of equal time periods are coupled on output terminal 68 to an averaging circuit 70 which is an active low pass filter of conventional design. The alternately occurring output signals of averaging circuit 70 correspond to the output signals of the correlators 20 and 22 of FIG. 1.

As was mentioned above, the correlation of the common mode signals e'cm ∠0° and e'cm ∠90° with the hiline interference differential mode signal e'd, all of which are at 60 Hz frequency and also possibly including harmonics thereof, produces a $\sin^2$ function signal having a d.c. value. On the other hand, correlation of the common mode signals with the multifrequency differential mode seismic signal e'd (seismic) will produce a sine-cosine function signal that averages out to substantially zero, thereby substantially eliminating the differential mode seismic signal from the remainder of the correction or balancing circuit of this invention.

The output of averaging circuit 70 is coupled over lead 72 to an inverting comparator circuit 74 whose output signal U/D is high when the averaged signal on lead 72 is negative and is low when the averaged signal is positive. The U/D output signal is coupled to an UP/DOWN counter if FIG. 6 to control the direction of counting in a counter, as will be explained.

The output of averaging circuit 70 also is coupled to a full wave rectifier circuit 78 whose output d.c. output signal is coupled on line 82 to input pin 9 of a variable frequency oscillator 84. Variable frequency oscillator 84 is of known design, and may be the variable frequency oscillator portion of a CD4046 Micropower Phase-Locked Loop circuit described in the National Semiconductor Corporation specification sheets, pages 5-129 through 5-135. Variable frequency oscillator 84 produces an output clock signal on pin 4 whose frequency is proportional to the magnitude of the rectified signal on line 82, without regard to the polarity of the input signal. That is, as the input signal increases in magnitude the frequency of the output clock signal increases and as the magnitude of the input signal decreases in magnitude the frequency of the output clock signal correspondingly decreases.

Figure 6:
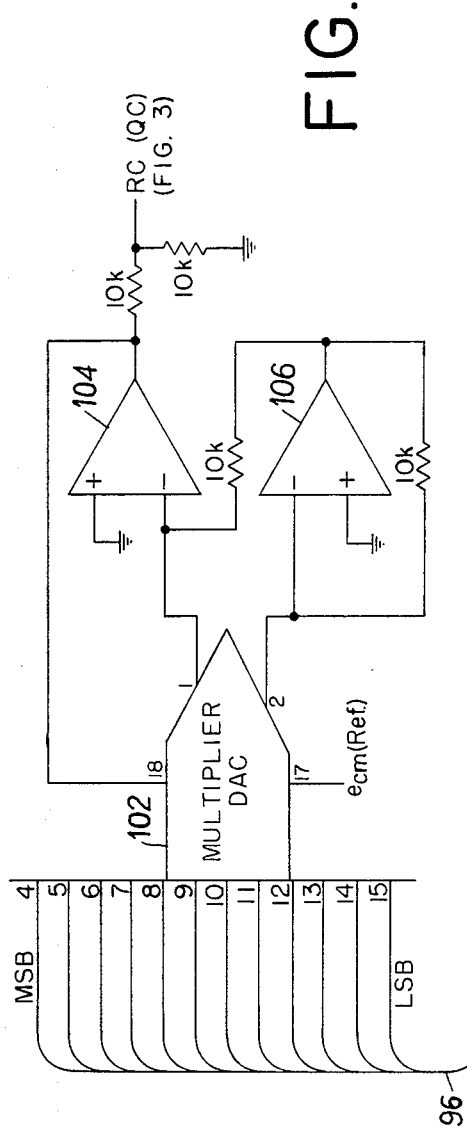
Figure 6:
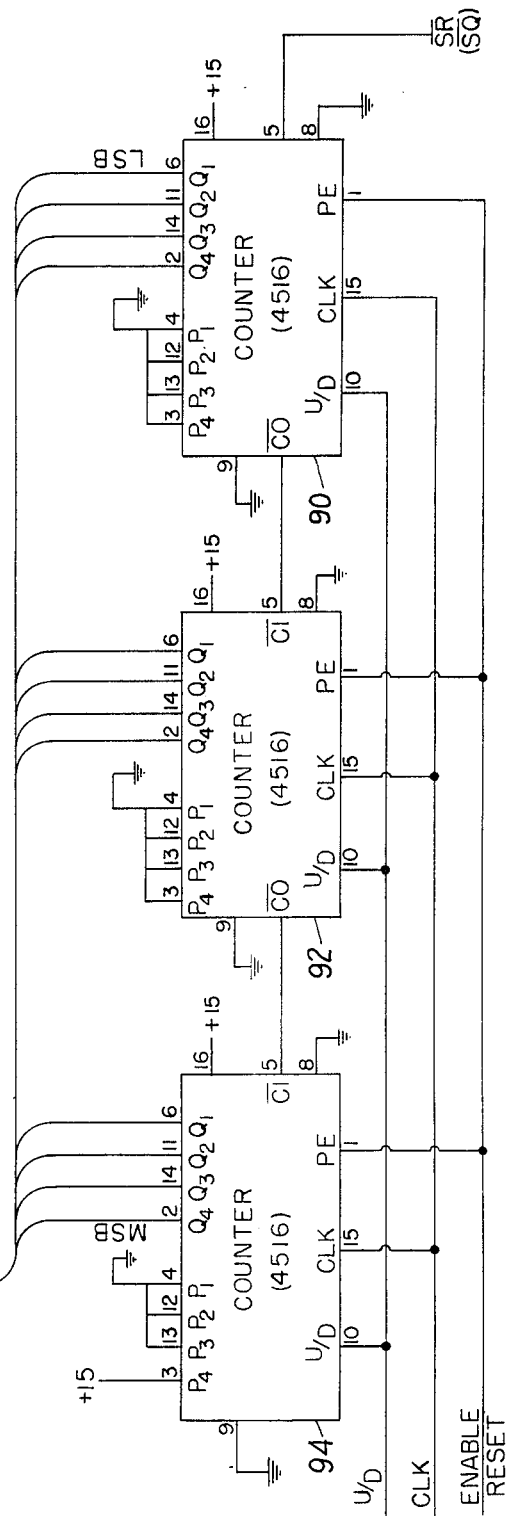

The variable frequency clock signal on pin 4 of VFO 84, FIG. 5 is coupled to the clock (CLK) input of the control and multiplier circuitry illustrated in FIG. 6. The up/down command signal U/D from the output of comparator 74 of FIG. 5 also is coupled as an input signal to the circuitry of FIG. 6. A reset signal also is coupled as an input to the circuitry of FIG. 6. It is to be understood that in the apparatus of this invention there actually are two identical circuits of the type illustrated in FIG. 6, one for the in-phase component of the correlation signal from correlator 20, FIG. 1, and one for the quadrature phase component from correlator 22. As was described above in connection with the embodiment of the invention illustrated in FIGS. 3 and 4, the in-phase and quadrature phase components of the common mode signal e'cm are multiplexed into the input of a single correlator circuit which alternately multiplies those signals with the differential mode signal e'd. Referring to FIG. 6, the inverted toggle or switching waveform $\overline{SR}$ from toggle oscillator 46, FIG. 3, is coupled to the enable input pin 5 of the in-phase control and multiplying circuitry and toggle waveform $\overline{SQ}$ from FIG. 3 is coupled to the corresponding input pin 5 of the quadrature phase control and multiplying circuitry. Because the in-phase and quadrature phase circuitry function identically, although alternately, in response to their respective input signals, only the in-phase circuitry will be described in connection with FIG. 6.

The control circuitry portion of FIG. 6 is comprised of an UP/DOWN counter formed by three 4-bit cascaded UP/DOWN counter devices 90,92,94 of the 4516 type.

When the counter is enabled by an appropriate signal coupled to all preset enable (PE) terminals and a $\overline{SR}$ signal at input terminal 5 of counter device 90, the counter counts up when the U/D command is high and counts down when U/D command is low. The counter ripples through from counter 90 to counter 92, and from counter 92 to counter 94, in conventional manner. The coded count is taken from output pins 6,11,14 and 2 from each counter device and is coupled over cable 96 to the input of a multiplying digital to analog (DAC) device 102. The least significant bit of the coded count is at output pin 6 of counter device 90 and the most significant bit is on output pin 2 of counter device 94.

Multiplying DAC 102 also has an analog input signal e'cm (ref) which is the output of common mode amplifier 14, FIG. 3. Multiplier 102 with its two operational amplifiers 104 and 106 may be a 12-bit Monolithic Multiplying DAC, type AD7541, manufactured by Analog Devices Incorporated, and described in the manfuacturer's specification sheets, pages 9-101 through 9-104. The circuit is constructed to operate in bipolar (4-quadrant) binary operation so that the output may be either + or − phase relative to the reference input. As disclosed in the manufacturer's specification sheet mentioned above, the digital input is offset binary coded and multiplies the reference signal e'cm (ref) according to the following code table.

| Digital Input | Nominal Analog Output |
| --- | --- |
| 111111111111 | −0.99951 V Ref. |
| 100000000001 | −0.00049 V Ref. |
| 100000000000 | 0 |
| 010000000000 | +0.50000 V Ref. |
| 000000000000 | +1.00000 V Ref. |

To establish the code for an initial affect, the P4 input terminal of counter device 94 is connected to +15 volts and the remainder of the P inputs of counter device 94, and all P inputs of counter devices 92 and 90, are grounded. The digital output of the counter with no input therefore is 100000000000.

In the operation of the circuitry of FIG. 6, assume that there is an undesired differential mode hiline signal on lines 11 and 12 and that the up/down count command signal U/D commands counter devices 90,92 and 94 to count up. When the $\overline{SR}$ toggle signal to pin 5 of counter device 90 is low, the counter counts up at a rate determined by the variable frequency clock signal CLK that is coupled to all CLK inputs. The counter will count until the 50% duty cycle signal $\overline{SR}$ goes high. This count is multiplied, in effect, with the e'cm (Ref) analog input signal in accordance with the above code table and the appropriate negative (out of phase) output signal will appear at the RC output terminal that is coupled to the output of operational amplifier 104. This signal is coupled to the correcting resistor $R_{b1}$, FIG. 3, and reduces the in-phase component of the differential mode interfering hiline signal e'd.

During the second half of the duty cycle of the toggle waveform, i.e., $\overline{SQ}$, the same type of operation will be performed in the duplicate control and DAC multiplying circuitry reserved for the quadrature phase component. During this second half of the toggle waveform, the counters 90, 92, 94 associated with the in-phase component, and described above in connection with FIG. 6, will maintain the count that was in them when the in-phase duty cycle terminated.

The correction signal coupled to resistor $R_{b1}$ will cause the in-phase component of the hiline differential mode signal to be reduced so that the correlation signal at the output of the averaging circuit 70, FIG. 5, is reduced in magnitude. This causes the frequency of the variale frequency clock signal from VFO 84 to decrease, and in turn, on the next in-phase half of the toggle signal $\overline{SR}$, the counter comprised of counter 90,92 and 94, FIG. 6, will count at the slower rate to further increase the count. The increased digital count applied to multiplying DAC 102 further increases the negative (out of phase) correcting signal at output terminal RC to further reduce the correlation signal at the output of correlator 20 toward zero. The circuit continues to function in this manner to continually hold the correlation signal to substantially zero. Any deviation from zero will cause the counter to count in the required direction to bring the correlation signal back to zero. Of course, the required count will remain in the counter.

The quadrature phase component control and multiplying circuitry of the same construction as FIG. 6 will operate alternately with the in-phase circuitry to produce the desired correction signal at its QC output terminal, FIG. 6, and this signal is connected to correcting capacitor $C_{b1}$ FIG. 3, to reduce the quadrature phase componoent of the differential mode hiline signal e'd to zero.

With both the in-phase and quadrature phase circuitry of FIG. 6 functioning as described, the voltages $e_1$ and $e_2$ of FIGS. 1 and 2 are balanced and the recorder input amplifier can satisfactorily reject the common mode signals.

It is a particulary advantageous feature of this invention to use the common mode signal e'cm (Ref) as the reference signal in the multilplying DAC of FIG. 6. This 60 Hertz signal, in the example assumed here, was induced onto lines 11 and 12 from the same source, or sources, as was the objectionable differential mode signal, so that the fundamental and harmonic frequency contents of both signals should be the same. This allows for the two signals to actually correlate in the desired manner. In some prior art systems, a reference signal for producing a correcting signal is artificially produced and does not have the same frequency content, including harmonics, as the objectionable signal. With this type of reference signal complete correction or balance of the line is quite difficult, if possible at all.

The use of the correlators in the closed loops allows the lines to be driven to a balanced condition so that the high rejection capabilities of the recorder input amplifier may be relied upon to adquately reject the remaining common mode hiline signals. As previously mentioned, a further important advantage of using real time correlation is that the seismic signal component in the differential mode may be eliminated from the differential mode signal component e′d, thus permitting greater accuracy in balancing the conductors 11 and 12 to the undesired hiline interference signal.

It will be understood that the undesired hiline signal in the differential mode will be substantially eliminated from the signal channel by the circuitry of this invention but the desired siesmic signal in the differential mode is substantially unaffected. This results from the fact that the correcting signal components $e'_{b1}$ and $e'_{b2}$ are simply scaled versions of the common mode signal $e'cm$, the seismic signal in the differential mode having been eliminated by the correlator.

It also should be understood that the quadrature phase component of the correlation signal may be obtained by shifting the phase of the differential mode signal e′d by 90° rather than the common mode signal e′cm, if desired.

While a preferred embodiment of the invention has been illustrated and described, other embodiments of the invention are possible. For example, in the above embodiment, each channel will have the circuitry described. It may be desired to have a number of channels time-share common circuitry, as is common in the art for processing signals form a plurality of sources.

I claim:

1. Means for substantially eliminating from a two conductor signal channel an undesired induced signal in a differential mode, wherein the undesired signal appears on the two conductors in a common mode signal component and in a differential mode signal component, said means comprising
   means for coupling from said two conductors a common mode signal component of the undesired signal,
   means for coupling from said two conductors a differential mode signal component of the undesired signal,
   correlating means for correlating said differential mode signal component with said common mode signal component to produce a correlation signal,
   means responsive to said correlation signal and to said common mode signal component for producing a correcting signal which when coupled to one of said conductors reduces said correlation signal substantially to zero.

2. The combination claimed in claim 1 wherein said correlating means includes,
   means for producing an in-phase correlation signal component, and
   means for producing a quadrature phase correlation signal component,
   said two correlation signal components being phased relative to the undesired signal on said conductors.

3. The combination claimed in claim 2 wherein said means for producing a correcting signal includes
   means responsive to said in-phase correlation signal component and to said common mode signal component for producing a first correcting signal component for substantially eliminating from the two conductors the in-phase component of the undesired differential mode signal, and
   means responsive to the quadrature phase correlation signal component and to said common mode signal component for producing a second correcting signal component for substantially eliminating from said two conductors the quadrature phase component of the undesired differential mode signal.

4. The combination claimed in claim 3 wherein said means for producing a correcting signal includes,
   a first correcting resistor and a first correcting capacitor each having one end connected to a first one of said conductors of the signal channel,
   a second correcting resistor and a second correcting capacitor each having one end connected to the second one of said conductors of the signal channel,
   means for coupling said first correcting signal component to the other end of said first correcting resistor,
   means for coupling said second correcting signal component to said first correcting capacitor, and
   means for connecting the other ends of said second correcting resistor and second correcting capacitor to ground.

5. The combination claimed in claim 4 wherein said two conductors are the hi and lo conductors of a signal channel, and wherein
   said first conductor is the hi conductor of the signal channel.

6. The combination claimed in claim 1 wherein said correlating means includes,
   signal multiplying means for multiplying said common mode and differential mode signal components of the undesired signal, and
   signal averaging means for averaging the output signal of said signal multiplying means.

7. The combination claimed in claim 6 wherein said correlating means includes,
   means for shifting by 90° the phase of one of said common mode or differential mode signal components,
   means for coupling to said signal multiplying means first the unshifted and then the shifted signal component of said one of the common mode or differential mode signal components, and
   means for coupling the other one of the common mode or differential mode or differential mode signal components to the signal multiplying means when said shifted and unshifted components of said one signal component are coupled to the signal multiplying means.

8. The combination claimed in claim 4 wherein the means for producing said correcting signals include
   means responsive to said correlating signal for producing a count that is a function of the correlating signal when the correcting signal is zero,
   means for multiplying said count and said common mode signal component to obtain said correcting signal, said means for producing said count operating to maintain a count which when multiplied by said common mode signal reduces said correlating signal substantially to zero.

9. The combination claimed in claim 8 wherein said means for multiplying said count and said common mode signal is a multiplying digital to analog converter that produces an output signal that may vary in both directions from a zero output.

10. The combination claimed in claim 9 wherein said means for producing a count includes,
an up/down counter, and
means responsive to the sign of the correlating signal to command the counter to count up or down depending on the sign of the correlating signal.

11. A method for substantially eliminating from a two conductor signal channel an undesired induced signal in a differential mode, wherein the undesired signal appears on the two conductors in a common mode component and in a differential mode component, said method comprising the steps
coupling from said two conductors a common mode signal component of the undesired induced signal,
coupling from said two conductors a differential mode component of the undesired induced signal,
correlating said differential mode signal component with said common mode signal component to produce a correlation signal,
operating on said common mode signal component and said correlation signal to produce a correcting signal which when coupled to one of said conductors, reduces the correlation signal substantially to zero.

12. The method claimed in claim 11 wherein the step of producing a correlating signal includes,
producing an in-phase correlation signal component, and
producing a quadrature phase correlation signal component,
said two correlation signal components being phased relative to the undesired signal on said conductors.

13. The method claimed in claim 12 wherein the step of producing a correcting signal includes
operating on each of said two correlation signal components with said common mode signal component to produce respective correcting signals which when connected to one of said conductors reduces said correlation signal components substantially to zero.

14. The method claimed in claim 13 wherein the step of producing correcting signals includes,
producing respective counts that are functions of the two correlating signals when the correcting signals are zero,
multiplying each of said counts with said common mode signal component to obtain respective correcting signals, and
maintaining respective counts that cause said correlating signals to go substantially to zero.

15. The method claimed in claim 14 wherein the step of producing respective counts includes,
counting in one direction when the respective correlating signal has one sign and counting in the opposite direction when the respective correlating signal has the opposite sign.

16. The method claimed in claim 15 wherein the steps of producing an in-phase correlation signal component and a quadrature phase signal component includes, alternately producing the in-phase and quadrature phase correlation signal components.

17. Circuitry for substantially eliminating from a two wire seismic signal channel an undesired induced hiline interference signal in a differential mode, wherein the undesired hiline interference signal also is present on the lines in a common mode component, said circuitry comprising
a common mode amplifier coupled to the two wires of the seismic channel for producing a hiline common mode signal having substantially no hiline differential mode component therein,
a differential mode amplifier coupled to the two wires of the seismic channel for producing a hiline differential mode signal having substantially no hiline common mode component therein,
phase shifting means responsive to said hiline common mode signal for producing a quadrature phase hiline common mode signal,
multiplexing means for producing a multiplexed signal comprised of said hiline common mode signal that occurs during a first one of alternately occurring time periods followed by said quadrature phase hiline common mode signal during the other one of said alternately occurring time periods,
signal correlation means responsive to said multiplexed signal and to said hiline differential mode signal for correlating the hiline common mode signal and the quadrature phase hiline common mode signal with said hiline differential mode signal and producing respective alternately ocurring first and second correlating signals in response thereto,
means responsive to said correlating signals for producing respective up/down count command signals that have different characteristics when the respective correlating signal has different signs,
means responsive to said correlating signals for producing corresponding clock signals whose frequencies are functions of the magnitudes of the respective correlating signal, without regard to the sign of the respective correlating signal,
first counter means responsive to a first one of said up/down command signals and to a first one of said clock signals for producing a first count that is a function of the magnitude of said first correlating signal without any correction applied to said seismic channel, said first up/down command signal and the first correlating signal being associated with said hiline common mode signal,
second counter means responsive to the second one of said up/down command signals and to said second correlating signal for producing a second count that is a function of the magnitude of the second correlating signal without any correction applied to said seismic channel,
a first multiplying means for multiplying said first count with said hiline common mode signal to produce a first analog correcting signal,
a second multiplying means for multiplying said second count with said hiline common mode signal to produce a second analog signal,
resistor means for coupling said first correcting signal to a hi one of the two wires of the seismic channel,
capacitor means for coupling said second correcting signal to said hi one of the two wires of the seismic channel, substantially identical resistor and capacitor means connected between the lo one of said two wires and ground, said first and second multiplying means operating to produce respective correcting signals that reduce said first and second correlating signals substantially to zero, said first and second counter means retaining respective counts that cause said correcting signals to reduce the correlation between said hiline common mode signal and said hiline differential mode signal to zero and to reduce the correlation between the quadrature phase hiline common mode signal and the hiline differential mode signal to zero.

* * * * *